United States Patent
Miyazaki

(10) Patent No.: US 9,584,014 B2
(45) Date of Patent: Feb. 28, 2017

(54) DC-DC CONVERTER

(71) Applicant: Kabushiki Kaisha Toshiba, Minato-ku, Tokyo (JP)

(72) Inventor: Takayuki Miyazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 14/478,584

(22) Filed: Sep. 5, 2014

(65) Prior Publication Data

US 2015/0137778 A1 May 21, 2015

(30) Foreign Application Priority Data

Nov. 15, 2013 (JP) .................................. 2013-237246

(51) Int. Cl.
*G05F 1/00* (2006.01)
*H02M 3/156* (2006.01)
*H02M 1/00* (2006.01)

(52) U.S. Cl.
CPC .... *H02M 3/156* (2013.01); *H02M 2001/0032* (2013.01); *H02M 2001/0048* (2013.01); *Y02B 70/1491* (2013.01); *Y02B 70/16* (2013.01)

(58) Field of Classification Search
CPC .......... G05F 1/461; G05F 1/462; G05F 1/465; G05F 1/56; G05F 1/563; G05F 1/565; G05F 1/575; G05F 1/59; G05F 1/595; H02M 2001/0025; H02M 1/088; H02M 3/145; H02M 3/156; H02M 3/158
USPC ....... 323/242, 243, 270, 274, 280, 284, 288; 363/47, 48
See application file for complete search history.

(56) References Cited

U.S. PATENT DOCUMENTS

| | | | | |
|---|---|---|---|---|
| 8,164,391 B2* | 4/2012 | Huynh | ................ | H02M 3/1563 307/82 |
| 8,319,482 B2 | 11/2012 | Matsuo et al. | | |
| 2007/0114986 A1* | 5/2007 | Yoshii | ................... | H02M 3/156 323/288 |
| 2012/0217941 A1* | 8/2012 | Chen | ..................... | H02M 3/156 323/271 |
| 2013/0038300 A1* | 2/2013 | Yanagida | ............ | H02M 3/1563 323/271 |
| 2013/0093407 A1* | 4/2013 | Heo | ....................... | H02M 3/156 323/290 |
| 2013/0208520 A1* | 8/2013 | Michishita | ............ | H02M 3/156 363/84 |
| 2014/0009130 A1* | 1/2014 | Galbis | ...................... | G05F 1/46 323/271 |

(Continued)

FOREIGN PATENT DOCUMENTS

| | | |
|---|---|---|
| JP | 05-236735 A | 9/1993 |
| JP | 2007-159275 A | 6/2007 |

(Continued)

*Primary Examiner* — Adolf Berhane
*Assistant Examiner* — Gary Nash
(74) *Attorney, Agent, or Firm* — White & Case LLP

(57) ABSTRACT

According to one embodiment, a DC-DC converter includes a comparator circuit that compares a feedback voltage of an output voltage with a reference voltage and a control circuit that controls an output voltage based on an output signal of the comparator circuit. The comparator circuit performs a discrete-time operation in response to a clock signal, and a frequency of the clock signal is adjusted according to a load condition.

15 Claims, 12 Drawing Sheets

(56) References Cited

U.S. PATENT DOCUMENTS

2014/0217999 A1* 8/2014 Wibben .................. H02M 1/36
323/282

FOREIGN PATENT DOCUMENTS

| JP | 2010-104207 A | 5/2010 |
| JP | 2010-220378 A | 9/2010 |

* cited by examiner

DC-DC CONVERTER

CROSS-REFERENCE TO RELATED APPLICATIONS

This application is based upon and claims the benefit of priority from Japanese Patent Application No. 2013-237246, filed on Nov. 15, 2013; the entire contents of which are incorporated herein by reference.

FIELD

Embodiments described herein relate generally to a DC-DC converter.

BACKGROUND

Conventionally, in a DC-DC converter that executes control to equalize a DC input voltage with a reference voltage, a pulse width modulation (hereinafter, PWM) method in which a pulse width is controlled by maintaining a frequency of a signal that turns on a switching transistor constant, and a pulse frequency modulation (hereinafter, PFM) method in which a frequency is controlled by maintaining a pulse width constant have been known.

There is also a technique that executes control by the PWM method at the time of a heavy load, and switches to control by the PFM method that can reduce the number of switching operations of the switching transistor at the time of a light load. However, even in the PFM method that suppresses power consumption, a comparator that operates by a steady current is generally used in order to monitor a load condition. Therefore, there is still a room for improvement in suppressing power consumption by the comparator and increasing the conversion efficiency.

DETAILED DESCRIPTION

In general, according to one embodiment, a DC-DC converter includes a comparator circuit that compares a feedback voltage of an output voltage with a reference voltage and a control circuit that controls the output voltage based on an output signal of the comparator circuit, in which the comparator circuit performs a discrete-time operation.

Exemplary embodiments of a DC-DC converter will be explained below in detail with reference to the accompanying drawings. The present invention is not limited to the following embodiments.

First Embodiment

Figure 1A:
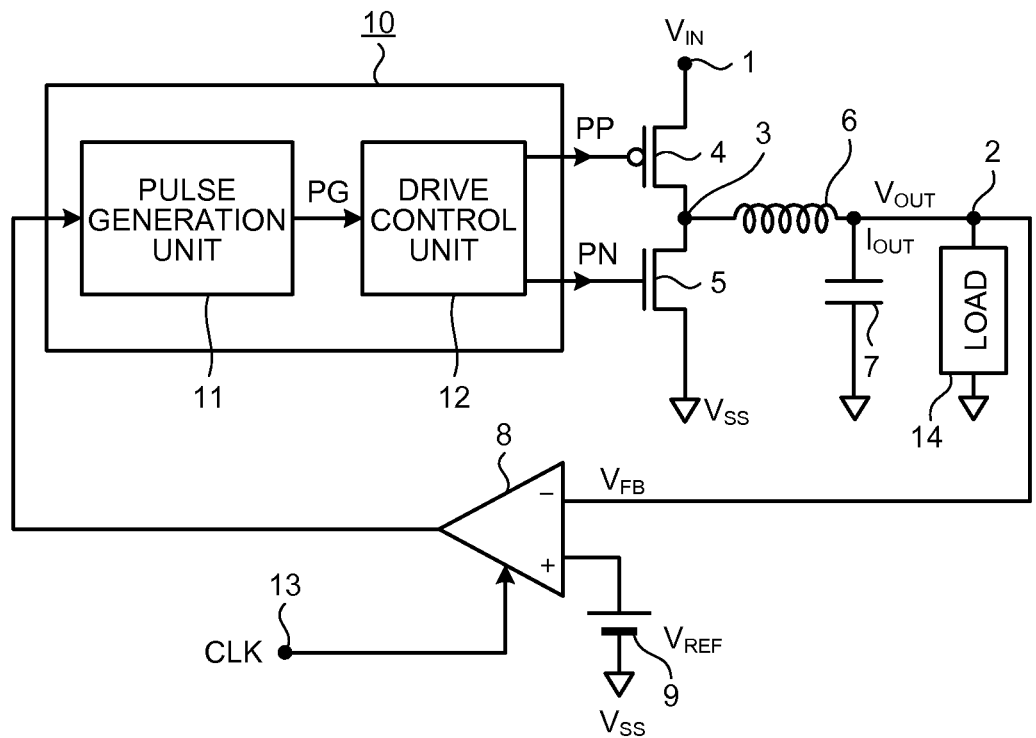
FIGS. 1A and 1B illustrate a DC-DC converter and an operation waveform thereof according to a first embodiment.
Figure 1B:
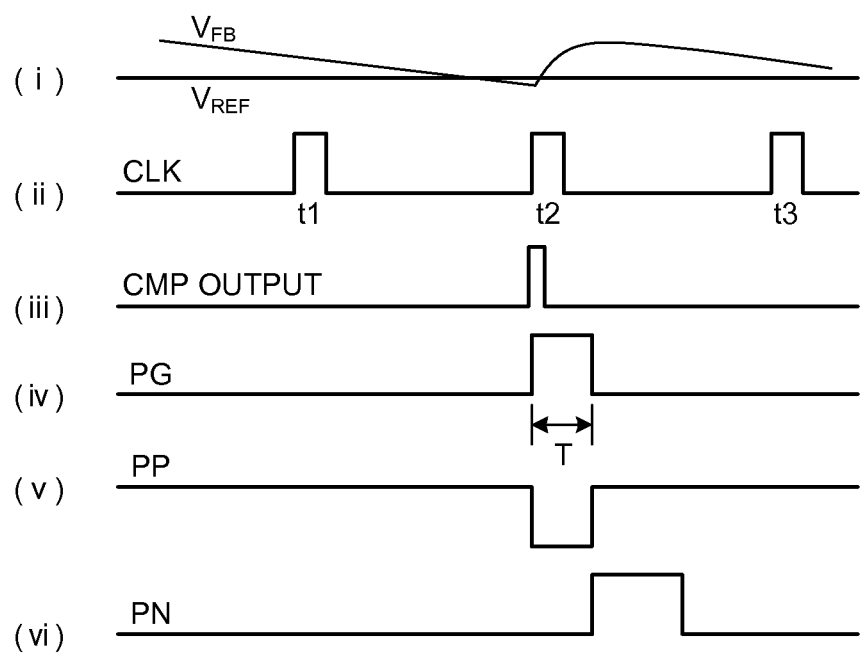

FIGS. 1A and 1B illustrate a DC-DC converter and an operation waveform thereof according to a first embodiment. The DC-DC converter of the present embodiment shown in FIG. 1A includes an input terminal 1 to which a DC input voltage $V_{IN}$ is applied and an output terminal 2 from which an output voltage $V_{OUT}$ is output. A source electrode of a PMOS transistor 4 constituting a high-side switch is connected to the input terminal 1, and a drain electrode of the PMOS transistor 4 is connected to an output node 3. A drain electrode of an NMOS transistor 5 constituting a low-side switch is connected to the output node 3, and a ground potential $V_{SS}$ is supplied to a source electrode of the NMOS transistor 5.

One end of an inductor 6 is connected to the output node 3, and the other end of the inductor 6 is connected to the output terminal 2. One end of a capacitor 7 is connected to the output terminal 2, and the other end of the capacitor 7 is grounded. A load 14 to which the output voltage $V_{OUT}$ is supplied is connected to the output terminal 2.

The output voltage $V_{OUT}$ is supplied to an inverting input terminal (−) of a comparator 8 as a feedback voltage $V_{FB}$. A configuration in which the output voltage $V_{OUT}$ is divided and fed back can be also used. A reference voltage source 9 is connected to a non-inverting input terminal (+) of the comparator 8, and a reference voltage $V_{REF}$ is applied thereto. The DC-DC converter executes control to equalize the output voltage $V_{OUT}$ with the reference voltage $V_{REF}$. A clock signal CLK to be supplied to a clock-signal input terminal 13 is supplied to the comparator 8. The comparator 8 performs a discrete-time operation in which the comparator 8 operates only when the clock signal CLK is supplied to output a comparison result between the feedback voltage $V_{FB}$ and the reference voltage $V_{REF}$.

An output signal of the comparator 8 is supplied to a pulse generation unit 11 constituting a control circuit 10. The pulse generation unit 11 is formed of, for example, a monostable multivibrator (not shown), and outputs one pulse signal having a constant High-level period T in response to the output signal from the comparator 8. A pulse signal PG of the pulse generation unit 11 is supplied to a drive control unit 12. The drive control unit 12 supplies drive signals PP and PN that alternately turn on/off the PMOS transistor 4 constituting the high-side switch and the NMOS transistor 5 constituting the low-side switch to gate electrodes of the respective MOS transistors, in response to the pulse signal PG of the pulse generation unit 11. The drive signal PP to be supplied to the PMOS transistor 4 constituting the high-side switch has a constant period during which the PMOS transistor 4 is turned on based on the pulse signal PG (a constant ON time). That is, in the present embodiment, the pulse signal has a constant Low-level period. The drive control unit 12 provides a dead time period to prevent the PMOS transistor 4 constituting the high-side switch and the NMOS transistor 5 constituting the low-side switch to be simultaneously turned on, and outputs the drive signals PP and PN.

FIG. 1B schematically illustrates an operation waveform according to the first embodiment. (i) in FIG. 1B denotes the feedback voltage $V_{FB}$ and the reference voltage $V_{REF}$. (ii) in FIG. 1B denotes the clock signal CLK which is supplied to the comparator 8 at timings t1, t2, and t3. (iii) in FIG. 1B denotes an output signal of the comparator 8. Because the feedback voltage $V_{FB}$ is lower than the reference voltage $V_{REF}$ only at the time of a comparison operation at the timing t2, a High-level signal is output from the comparator 8. The pulse generation unit 11 outputs one pulse signal PG having the constant High-level period T, in response to the output signal of the comparator 8 ((iv) in FIG. 1B). The drive control unit 12 outputs the drive signal PP that turns on the PMOS transistor 4 ((v) in FIG. 1B) and the drive signal PN that turns on the NMOS transistor 5 ((vi) in FIG. 1B) in response to the output pulse signal of the pulse generation unit 11. By performing a series of operations associated with the comparison operation between the feedback voltage $V_{FB}$ and the reference voltage $V_{REF}$ by the comparator 8, control to equalize the output voltage $V_{OUT}$ with the reference voltage $V_{REF}$ is executed.

In the present embodiment, the comparator 8 that compares the feedback voltage $V_{FB}$ with the reference voltage $V_{REF}$ operates only in a period during which the clock signal CLK is supplied. That is, an electric current is consumed only in a limited period during which the clock signal CLK is supplied. The comparator 8 outputs an output signal only when the feedback voltage $V_{FB}$ is lower than the reference voltage $V_{REF}$, and switching operations of the PMOS transistor 4 and the NMOS transistor 5 are performed. That is, the maximum value of a switching frequency of the PMOS transistor 4 and the NMOS transistor 5 are limited to be equal to or lower than the frequency of the clock signal CLK. Accordingly, power consumption associated with the switching operations of the PMOS transistor 4 and the NMOS transistor 5 can be reduced. When an output current $I_{OUT}$ is small as at the time of a light load, the conversion efficiency can be improved significantly by reducing the power consumption. The present embodiment belongs to PFM control that controls the output voltage by changing the switching frequency of the high-side switch and the low-side switch. However, because the comparator 8 that performs the comparison operation has a configuration of a discrete-time operation in which the comparator 8 itself is operated only when the clock signal CLK is supplied, the power consumption can be reduced significantly.

For example, a case of a step-down DC-DC converter in which the input voltage $V_{IN}$ is 5V (volt), the output voltage $V_{OUT}$ is 1V, and the output current $I_{OUT}$ is 100 μA (microampere) is considered here. When a continuous-time comparator is used, current consumption of the comparator is about 10 μA, and power consumption becomes 50 μW (microwatt). On the other hand, in the case of the discrete-time comparator according to the present embodiment, an electric current of 1000 μA flows for about 10 nS (nanosecond) for each clock signal CLK. In order to set the output current $I_{OUT}$ to 100 μA, the comparator needs to be operated at about 1 kHz (kilohertz). Therefore, power consumption of the comparator becomes 1000 μA×10 nS×5 V×1000/S (second)=50 nW (nanowatt), which is power consumption of 1/1000 of the continuous-time comparator. When the conversion efficiency is compared by assuming that a power loss due to a factor other than the comparator is about 10 μW, the following result is obtained.

The conversion efficiency at the time of using the continuous-time comparator is as follows.

$$100 \text{ μA} \times 1 \text{ V} / (100 \text{ μA} \times 1 \text{ V} + 10 \text{ μW} + 50 \text{ μW}) = 62.5\% \quad (1)$$

Meanwhile, the conversion efficiency at the time of using the discrete-time comparator according to the present embodiment is as follows.

$$100 \text{ μA} \times 1 \text{ V} / (100 \text{ μA} \times 1 \text{ V} + 10 \text{ μW} + 50 \text{ nW}) = 90.9\% \quad (2)$$

As is obvious from the comparison between the above equations (1) and (2), the conversion efficiency can be improved significantly by using the comparator 8 having a configuration in which the discrete-time operation is performed according to the clock signal CLK.

Figure 2:
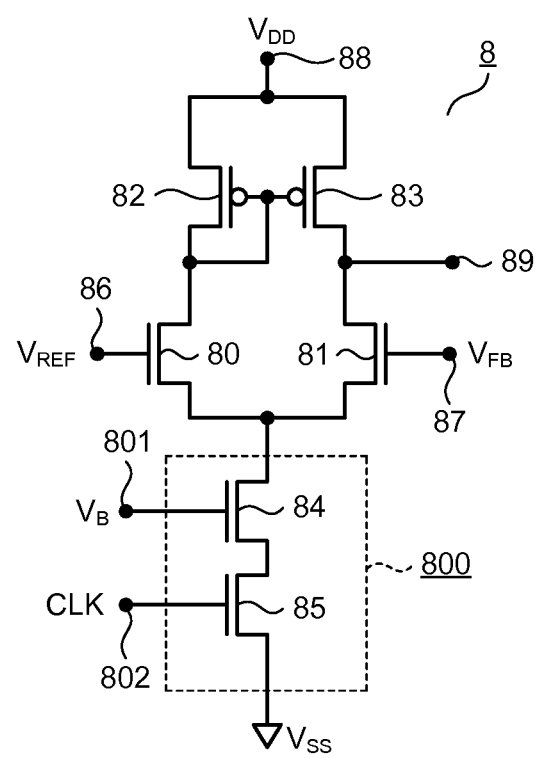
FIG. 2 illustrates an embodiment of a comparator.

FIG. 2 illustrates an embodiment of a comparator. The comparator 8 according to the present embodiment has NMOS transistors 80 and 81 that constitute a differential pair. A gate electrode of the NMOS transistor 80 is connected to a terminal 86 to which the reference voltage $V_{REF}$ is applied, and a gate electrode of the NMOS transistor 81 is connected to a terminal 87 to which the feedback voltage $V_{FB}$ is supplied. Source electrodes of the NMOS transistors 80 and 81 are connected to each other, and then connected to a drain electrode of an NMOS transistor 84. A source electrode of the NMOS transistor 84 is connected to a drain electrode of an NMOS transistor 85, a source electrode of the NMOS transistor 85 is applied with a ground potential $V_{SS}$. A gate electrode of the NMOS transistor 84 is connected to a terminal 801 to which a bias voltage $V_B$ is supplied. The NMOS transistors 84 and 85 constitute a current source circuit 800 of the comparator 8. A drain electrode of the NMOS transistor 80 is connected to a drain electrode and a gate electrode of a PMOS transistor 82. A source electrode of the PMOS transistor 82 is connected to a terminal 88 to which a power-supply voltage $V_{DD}$ is applied. A gate electrode of the PMOS transistor 82 is connected to a gate electrode of a PMOS transistor 83. A source electrode of the PMOS transistor 83 is connected to the terminal 88 and a drain electrode thereof is connected to an output terminal 89.

A gate electrode of the NMOS transistor 85 is connected to a terminal 802 to which the clock signal CLK is supplied. When the clock signal CLK is at a High level, the NMOS transistor 85 is turned on, and a bias current from the current source circuit 800 is supplied to the NMOS transistors 80 and 81 constituting the differential pair. The comparator 8 operates only in a period during which the bias current is supplied from the current source circuit 800. That is, the comparator 8 performs the discrete-time operation according to the clock signal CLK. A comparison result between the feedback voltage $V_{FB}$ and the reference voltage $V_{REF}$ by the discrete-time operation of the comparator 8 is output from the output terminal 89. That is, when the feedback voltage $V_{FB}$ is lower than the reference voltage $V_{REF}$, the output of the output terminal 89 becomes a High level.

Second Embodiment

Figure 3:
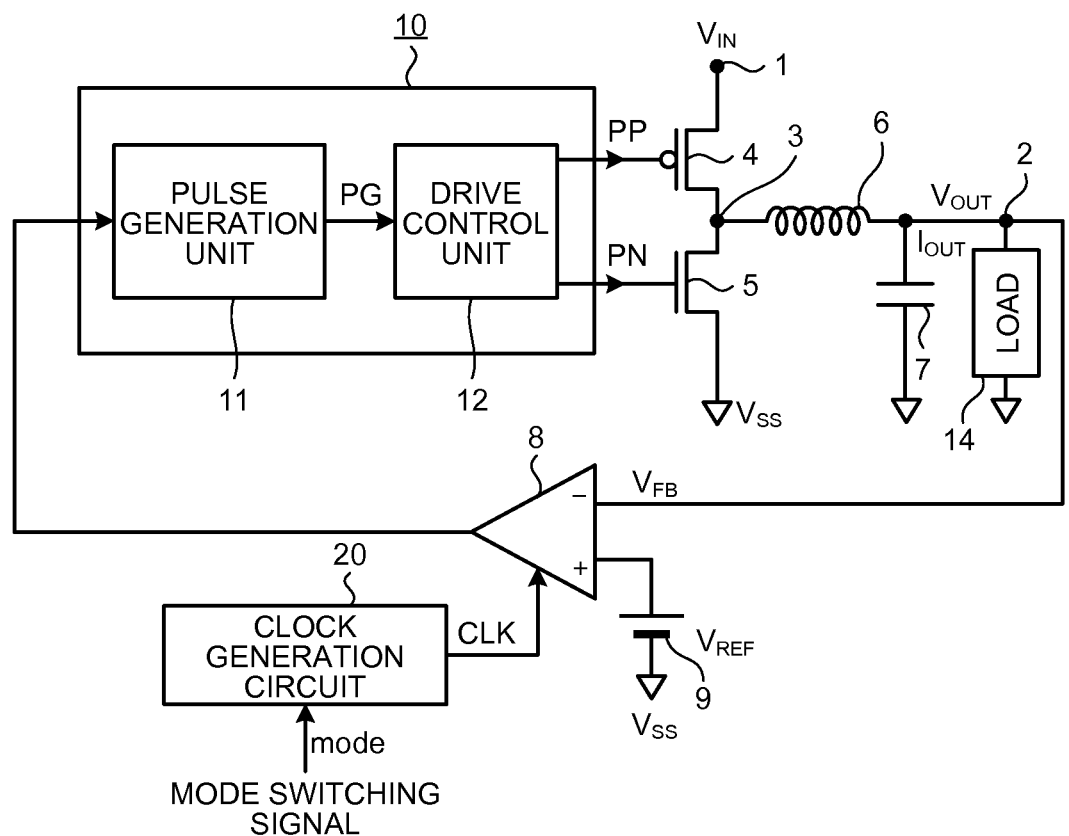
FIG. 3 illustrates a DC-DC converter according to a second embodiment.

FIG. 3 illustrates a DC-DC converter according to a second embodiment. Constituent elements corresponding to those of the embodiment described above are denoted by like reference signs and explanations thereof will be omitted. The present embodiment has a clock generation circuit 20. The clock generation circuit 20 includes, for example, a ring oscillator (not shown) and a frequency divider (not shown) that can be integrated. The present embodiment is suitable when the DC-DC converter is mounted on a semiconductor substrate. A mode switching signal "mode" is supplied to the clock generation circuit 20. The mode switching signal "mode" is a switching signal for switching, for example, an operation mode of the load 14 to a heavy load mode in which the output current $I_{OUT}$ increases, or on the contrary, switching to a light load mode in which the output current $I_{OUT}$ decreases. When the operation mode of the load 14 is switched to a heavy load mode, the output current $I_{OUT}$ can be increased by increasing the frequency of the clock signal CLK from the clock generation circuit 20, thereby enabling to execute control while taking a load variation into consideration in advance. At the time of switching the operation of the load 14 to the heavy load mode, for example, control to increase an oscillation frequency of the ring oscillator or control to decrease a division ratio of the frequency divider that constitute the clock generation circuit 20 is executed by the mode switching signal "mode".

According to the present embodiment, by controlling the frequency of the clock signal CLK to be supplied to the comparator 8 according to the mode switching signal "mode", the output current $I_{OUT}$ can be controlled, while taking the load variation into consideration in advance. In a configuration in which the pulse generation unit 11 outputs one pulse signal PG in response to the High-level output signal from the comparator 8, and the drive control unit 12 outputs the drive signals PP and PN that drive the PMOS transistor 4 and the NMOS transistor 5 in response to the pulse signal PG, the switching frequency of the PMOS transistor 4 and the NMOS transistor 5 becomes the frequency of the clock signal CLK supplied to the comparator 8 at most. Therefore, by suppressing the frequency of the clock signal CLK to be low, power consumption by the switching operation of the PMOS transistor 4 and the NMOS transistor 5 can be suppressed.

Third Embodiment

Figure 4:
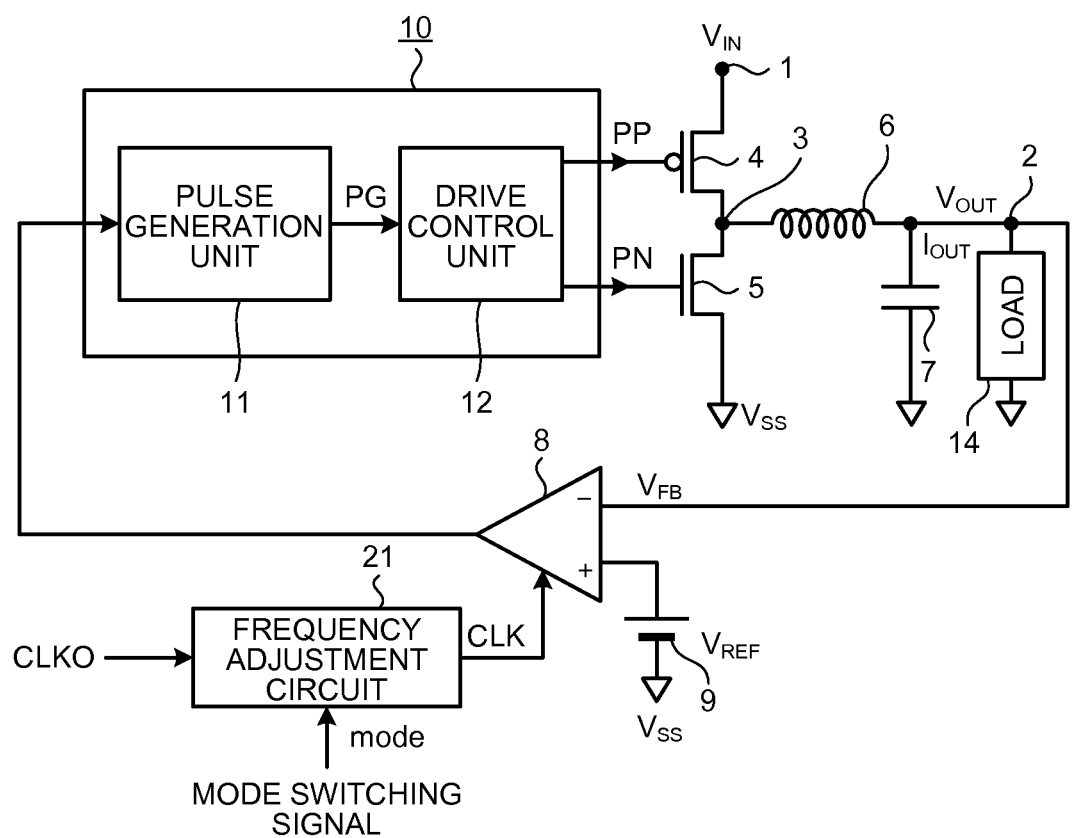
FIG. 4 illustrates a DC-DC converter according to a third embodiment.

FIG. 4 illustrates a DC-DC converter according to a third embodiment. Constituent elements corresponding to those of the embodiments described above are denoted by like reference signs and explanations thereof will be omitted. The present embodiment has a frequency adjustment circuit 21. The frequency adjustment circuit 21 includes, for example, a counter (not shown), and outputs the clock signal CLK when a count value reaches a predetermined value. For example, a clock signal CLKO from a crystal oscillator (not shown) is supplied to the frequency adjustment circuit 21. A mode switching signal "mode" is supplied to the frequency adjustment circuit 21. The mode switching signal "mode" is a switching signal for switching, for example, an operation mode of the load 14 to a heavy load mode in which the output current $I_{OUT}$ increases, or on the contrary, switching to a light load mode in which the output current $I_{OUT}$ decreases. By adjusting the count value at which the frequency adjustment circuit 21 outputs the clock signal CLK based on the mode switching signal "mode", a division ratio of the frequency adjustment circuit 21 is adjusted.

According to the present embodiment, by adjusting the frequency of the clock signal CLKO supplied from outside by the frequency adjustment circuit 21 based on the mode switching signal "mode" and supplying the adjusted clock signal to the comparator 8, the output current $I_{OUT}$ can be adjusted according to switching of the operation mode of the load 14. Furthermore, because a highly accurate clock signal generated by the crystal oscillator or the like can be used as the external clock signal CLKO, accuracy of output control can be increased.

Figure 5A:
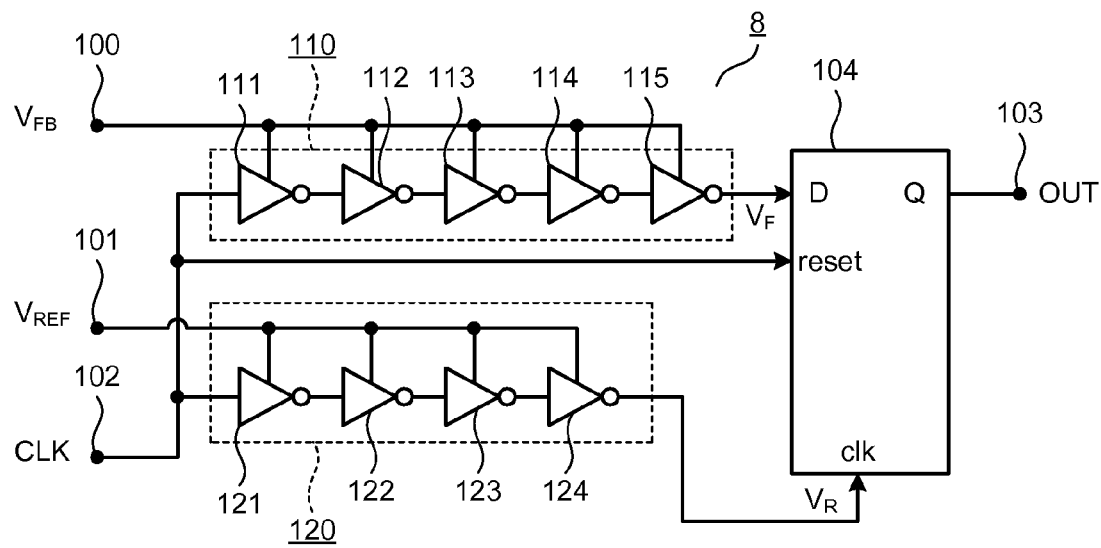
FIGS. 5A and 5B illustrate another embodiment of a comparator and an operation waveform thereof.
Figure 5B:
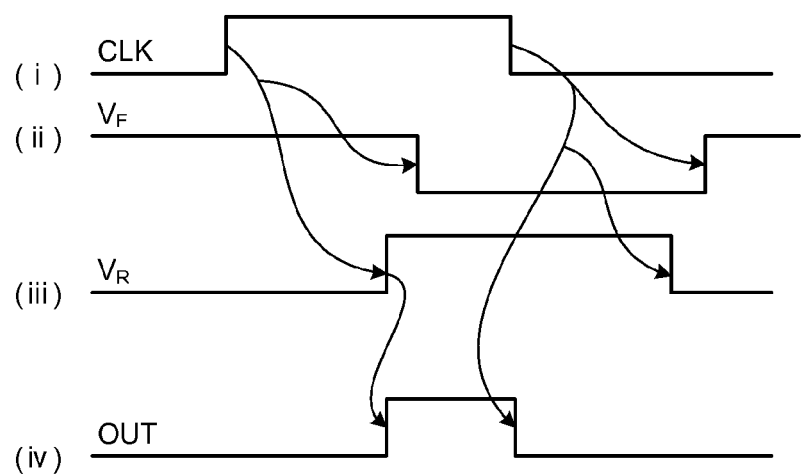

FIGS. 5A and 5B illustrate another embodiment of a comparator and an operation waveform thereof. FIG. 5A illustrates one embodiment of the comparator 8 using a delay cell. For example, in a delay cell formed of an inverter, a signal propagation speed changes according to a bias voltage or a bias current to be supplied, and as the bias voltage to be supplied becomes higher or the bias current increases, the signal propagation speed increases. A magnitude relation of the voltages to be supplied can be compared by detecting a difference in a delay time of signal propagation, which is generated between delay cell columns, according to a difference in the bias voltage or the bias current to be supplied. The comparator 8 according to the present embodiment has a first delay cell column 110 and a second delay cell column 120. The first delay cell column 110 has five serially connected inverters (111 to 115). Each inverter in the first delay cell column 110 is biased by the feedback voltage $V_{FB}$ supplied to a terminal 100. The second delay cell column 120 has four serially connected inverters (121 to 124). Each inverter in the second delay cell column 120 is biased by the reference voltage $V_{REF}$ supplied to a terminal 101. The clock signal CLK supplied to a terminal 102 is supplied to the first inverter 111 in the first delay cell column 110 and the first inverter 121 in the second delay cell column 120.

The comparator 8 has a D-type flip-flop circuit 104. An output signal $V_F$ of the first delay cell column 110 is supplied to a D terminal of the D-type flip-flop circuit 104 from the fifth inverter 115. An output signal $V_R$ of the second delay cell column 120 is supplied to a clock terminal clk of the D-type flip-flop circuit 104 from the fourth inverter 124. The clock signal CLK is supplied to a reset terminal "reset" of the D-type flip-flop circuit 104.

FIG. 5B schematically illustrates an operation waveform of the comparator 8. (i) in FIG. 5B denotes the clock signal CLK to be supplied. (ii) in FIG. 5B denotes the output signal $V_F$ of the first delay cell column 110. The clock signal CLK is delayed by the five inverters (111 to 115) and input to the D terminal of the D-type flip-flop circuit 104 as the output signal $V_F$. Because the first delay cell column 110 has odd number inverters, a potential relation of the clock signal CLK is inverted and input to the D terminal of the D-type flip-flop circuit 104. (iii) in FIG. 5B denotes the output signal $V_R$ of the second delay cell column 120. The clock signal CLK is delayed by the four inverters (121 to 124) and input to the clock terminal clk of the D-type flip-flop circuit 104 as the output signal $V_R$. (iv) in FIG. 5B denotes an output signal OUT to be output from a Q terminal of the D-type flip-flop circuit 104 to an output terminal 103.

The output signal OUT becomes a High level or a Low level according to the level of the output signal $V_F$ at a timing when the output signal $V_R$ rises, and becomes a Low level in response to a fall of the clock signal CLK supplied to the reset terminal "reset". The output signal OUT is supplied to the control circuit 10 of the DC-DC converter. When the output signal $V_R$ of the second delay cell column 120 biased by the reference voltage $V_{REF}$ does not reach the clock terminal clk of the D-type flip-flop circuit 104 before the fall of the output signal $V_F$ of the first delay cell column 110 biased by the feedback voltage $V_{FB}$, the output signal OUT is not output. A delay time of signal propagation of the first delay cell column 110 and the second delay cell column 120 changes depending on the feedback voltage $V_{FB}$ and the reference voltage $V_{REF}$ applied as the bias voltage. Therefore, for example, the comparator 8 that compares the magnitude relation between the feedback voltage $V_{FB}$ and the reference voltage $V_{REF}$ and outputs the output signal OUT only when the feedback voltage $V_{FB}$ is lower than the reference voltage $V_{REF}$ can be configured.

The comparator 8 including the delay cells operates only in a period during which the clock signal CLK is supplied. That is, the discrete-time operation is performed according to the clock signal CLK. For example, when the delay cell is formed of a CMOS inverter, the CMOS inverter operates only in a considerably short time at the time of rise of the clock signal CLK or fall of the clock signal CLK. Consequently, power consumption can be reduced.

Figure 6A:
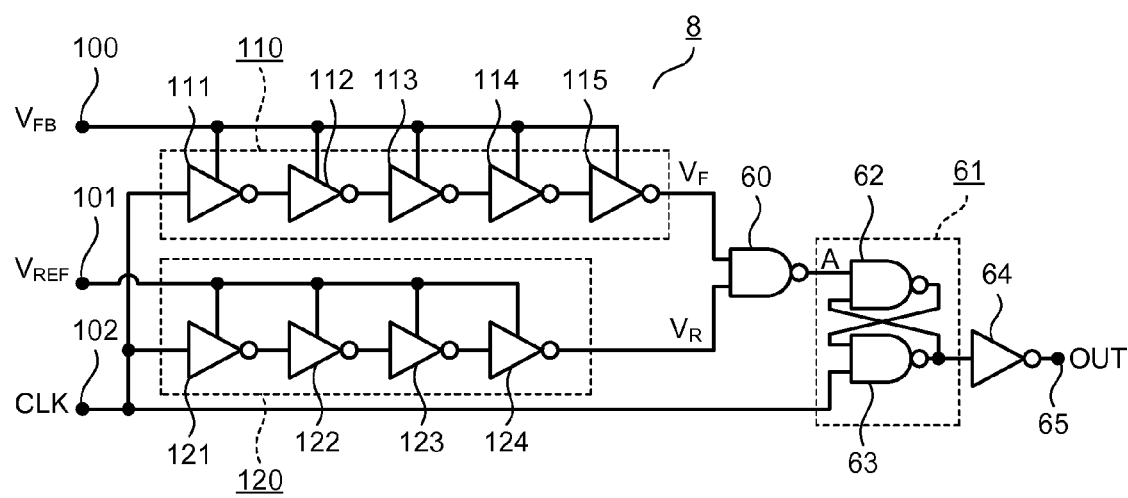
FIGS. 6A and 6B illustrate further another embodiment of a comparator and an operation waveform thereof.
Figure 6B:
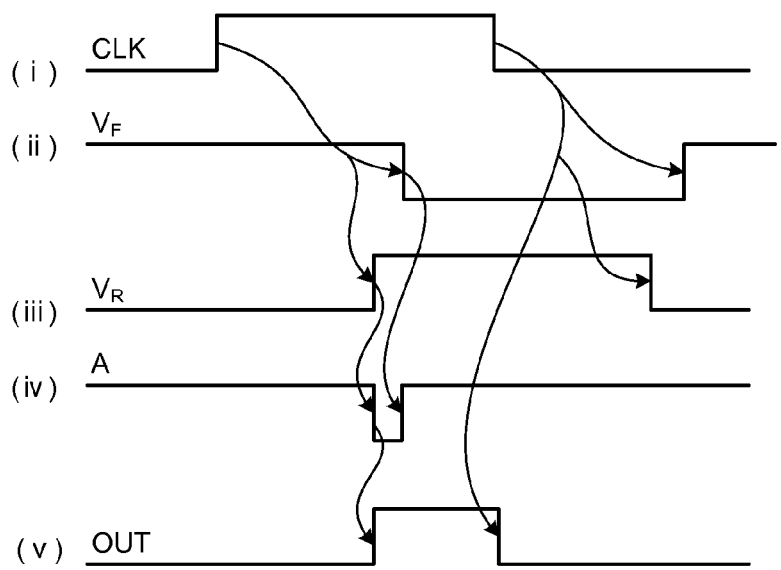

FIGS. 6A and 6B illustrate another embodiment of a comparator and an operation waveform thereof. Constituent elements corresponding to those of the embodiments described above are denoted by like reference signs and explanations thereof will be omitted. The comparator 8 according to the present embodiment shown in FIG. 6A includes a NAND circuit 60 to which the output signal $V_F$ of the first delay cell column 110 and the output signal $V_R$ of the second delay cell column 120 are input. An output signal A of the NAND circuit 60 is supplied to a latch circuit 61. The latch circuit 61 has two NAND circuits 62 and 63. An output terminal of the NAND circuit 60 is connected to one of input terminals of the NAND circuit 62. An output terminal of the NAND circuit 62 is connected to one of input terminals of the NAND circuit 63. An output terminal of the NAND circuit 63 is connected to the other input terminal of the NAND circuit 62. The clock signal CLK is supplied to the other input terminal of the NAND circuit 63. An output terminal of the NAND circuit 63 is connected to an output terminal 65 via an inverter 64.

FIG. 6B schematically illustrates an operation waveform of the comparator 8 according to the present embodiment. (i) in FIG. 6B denotes the clock signal CLK to be supplied. (ii) in FIG. 6B denotes the output signal $V_F$ of the first delay cell column 110. The clock signal CLK is delayed by the five inverters (111 to 115) and supplied to one of input terminals of the NAND circuit 60 as the output signal $V_F$. Because the first delay cell column 110 has odd number inverters, a potential relation of the clock signal CLK is inverted and input to the NAND circuit 60. (iii) in FIG. 6B denotes the output signal $V_R$ of the second delay cell column 120. The clock signal CLK is delayed by the four inverters (121 to 124) and input to the other input terminal of the NAND circuit 60 as the output signal $V_R$. (iv) in FIG. 6B denotes an output signal A of the NAND circuit 60. The output signal A of the NAND circuit 60 becomes a Low level at a rise of the output signal $V_R$ of the second delay cell column 120 and becomes a High level at a fall of the output signal $V_F$ of the first delay cell column 110. (v) in FIG. 6B denotes a signal OUT, which is an output signal of the latch circuit 61 inverted by the inverter 64 and output from the output terminal 65.

The output signal OUT becomes a High level at a fall of the output signal A of the NAND circuit 60, and becomes a Low level at a fall of the clock signal CLK. When the output signal $V_R$ of the second delay cell column 120 biased by the reference voltage $V_{REF}$ does not reach the NAND circuit 60 before the fall of the output signal $V_F$ of the first delay cell column 110 biased by the feedback voltage $V_{FB}$, the output signal A of the NAND circuit 60 is not output. Accordingly, the output signal OUT from the inverter 64 is not output either. A delay time of signal propagation of the first delay cell column 110 and the second delay cell column 120 changes depending on the feedback voltage $V_{FB}$ and the reference voltage $V_{REF}$ applied as the bias voltage. Therefore, for example, the comparator 8 that compares the magnitude relation between the feedback voltage $V_{FB}$ and the reference voltage $V_{REF}$ and outputs the output signal OUT only when the feedback voltage $V_{FB}$ is lower than the reference voltage $V_{REF}$ can be configured.

The comparator 8 according to the present embodiment maintains a High level state of the output signal OUT until the fall of the clock signal CLK. Therefore, adjustment can be performed so that a pulse width of the output signal OUT does not become too short. Accordingly, design margin of the control circuit 10 supplied with the output signal OUT can be ensured. Because the comparator 8 according to the present embodiment also performs the discrete-time operation only in a period during which the clock signal CLK is applied, power consumption can be reduced.

FIGS. 7A to 7D illustrate embodiments of the delay cell to be used in the comparator. The delay cell in FIG. 7A has a first PMOS transistor 210, whose source electrode is connected to a terminal 203 to which the power-supply voltage $V_{DD}$ is applied. A drain electrode of the first PMOS transistor 210 is connected to a source electrode of a second PMOS transistor 211. A drain electrode of the second PMOS transistor 211 is connected to a drain electrode of a first NMOS transistor 212. A source electrode of the first NMOS transistor 212 is connected to a drain electrode of a second NMOS transistor 213. A source electrode of the second NMOS transistor 213 is connected to a terminal 204 to which the ground potential $V_{SS}$ is applied. A gate electrode of the first PMOS transistor 210 is connected to the source electrode of the second NMOS transistor 213 and grounded. Because the potential voltage $V_{SS}$ is applied to the gate electrode, the first PMOS transistor 210 is turned on.

A gate electrode of the second NMOS transistor 213 is connected to an input terminal 202 to which the feedback voltage $V_{FB}$ or the reference voltage $V_{REF}$ is applied. When it is used in the first delay cell column 110, the feedback voltage $V_{FB}$ is supplied to the input terminal 202, and when it is used in the second delay cell column 120, the reference voltage $V_{REF}$ is supplied to the input terminal 202. A drain current of the second NMOS transistor 213 is set according to the supplied voltage. The drain current of the second NMOS transistor 213 is supplied as the bias current to the second PMOS transistor 211 and the first NMOS transistor 212 constituting the CMOS inverter to which the clock signal CLK is applied. Therefore, the operation speed of the second PMOS transistor 211 and the first NMOS transistor 212 changes depending on the voltage applied to the terminal 202, to which the gate electrode of the second NMOS transistor 213 is connected. That is, a delay cell in which the signal propagation speed is controlled by the feedback voltage $V_{FB}$ or the reference voltage $V_{REF}$ supplied to the terminal 202 as the bias voltage of the gate electrode of the second NMOS transistor 213 is constituted. The second PMOS transistor 211 and the first NMOS transistor 212 constituting the CMOS inverter are turned on/off in response to a rise and a fall of the clock signal CLK supplied to the input terminal 200, and an output signal with the clock signal CLK being inverted is output from the output terminal 201.

Figure 7A:
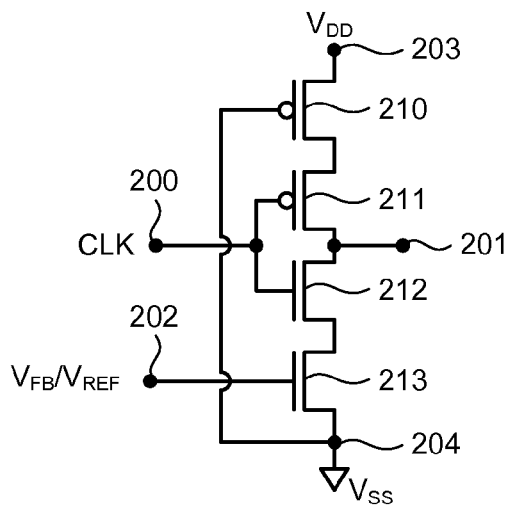
FIGS. 7A to 7D illustrate embodiments of a delay cell to be used in a comparator.
Figure 7B:
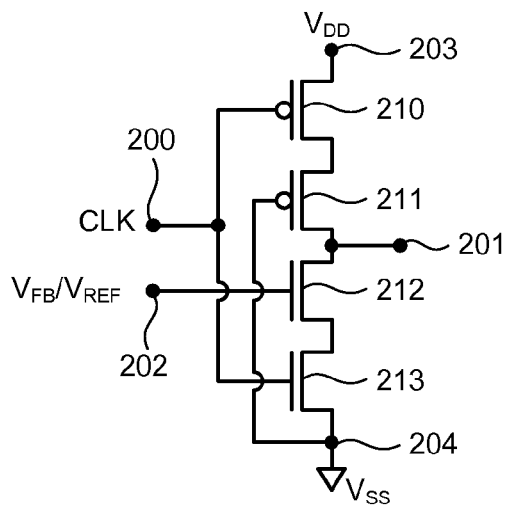

In the delay cell according to the embodiment shown in FIG. 7B, the gate electrode of the first NMOS transistor 212 is connected to the input terminal 202 to which the feedback voltage $V_{FB}$ or the reference voltage $V_{REF}$ is applied. The gate electrode of the second PMOS transistor 211 is connected to the terminal 204, to which the ground potential $V_{SS}$ is applied, and grounded. The gate electrodes of the first PMOS transistor 210 and the second NMOS transistor 213 are commonly connected, and connected to the input terminal 200 to which the clock signal CLK is supplied. The first PMOS transistor 210 and the second NMOS transistor 213 constitute the CMOS inverter. In the present embodiment, the first NMOS transistor 212, whose gate electrode is supplied with the feedback voltage $V_{FB}$ or the reference voltage $V_{REF}$, supplies a bias current to the first PMOS transistor 210 and the second NMOS transistor 213 constituting the CMOS inverter. That is, a delay cell in which the signal propagation speed is controlled by the feedback voltage $V_{FB}$ or the reference voltage $V_{REF}$ supplied to the terminal 202 as the bias voltage of the gate electrode of the first NMOS transistor 212 is constituted. The first PMOS transistor 210 and the second NMOS transistor 213 constituting the CMOS inverter are turned on/off in response to a rise and a fall of the clock signal CLK applied to the input terminal 200, and an output signal with the clock signal CLK being inverted is output from the output terminal 201.

Figure 7C:
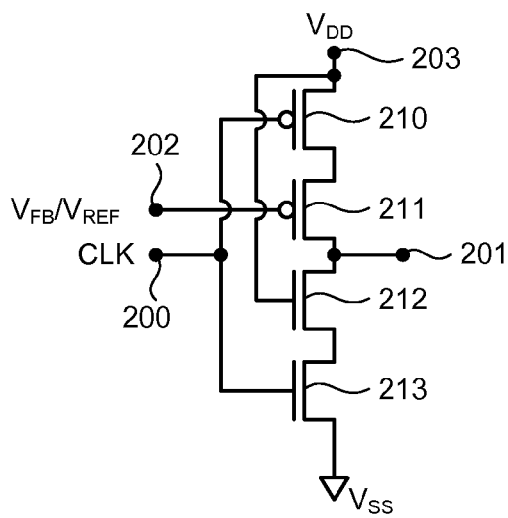

In the delay cell according to the embodiment shown in FIG. 7C, the gate electrode of the second PMOS transistor 211 is connected to the input terminal 202 to which the feedback voltage $V_{FB}$ or the reference voltage $V_{REF}$ is applied. The gate electrode of the first NMOS transistor 212 is connected to the terminal 203, to which the power-supply voltage $V_{DD}$ is applied. The gate electrodes of the first PMOS transistor 210 and the second NMOS transistor 213 are commonly connected, and connected to the input terminal 200 to which the clock signal CLK is supplied. The first PMOS transistor 210 and the second NMOS transistor 213 constitute the CMOS inverter. In the present embodiment, the second PMOS transistor 211, whose gate electrode is supplied with the feedback voltage $V_{FB}$ or the reference voltage $V_{REF}$, supplies the bias current to the first PMOS transistor 210 and the second NMOS transistor 213. That is, a delay cell in which the signal propagation speed is controlled by the feedback voltage $V_{FB}$ or the reference voltage $V_{REF}$ supplied to the terminal 202 as the bias voltage of the gate electrode of the second PMOS transistor 211 is constituted. The first PMOS transistor 210 and the second NMOS transistor 213 constituting the CMOS inverter are turned on/off in response to a rise and a fall of the clock signal CLK applied to the input terminal 200, and an output signal with the clock signal CLK being inverted is output from the output terminal 201.

Figure 7D:
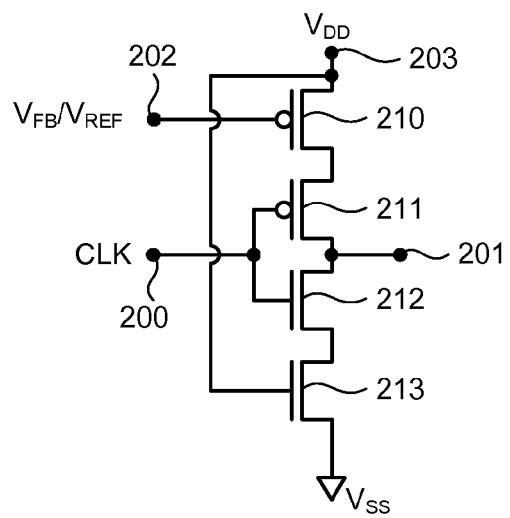

In the delay cell according to the embodiment shown in FIG. 7D, the gate electrode of the first PMOS transistor 210 is connected to the input terminal 202 to which the feedback voltage $V_{FB}$ or the reference voltage $V_{REF}$ is applied. The gate electrode of the second NMOS transistor 213 is connected to the terminal 203, to which the power-supply voltage $V_{DD}$ is applied. The gate electrodes of the second PMOS transistor 211 and the first NMOS transistor 212 are commonly connected, and connected to the input terminal 200 to which the clock signal CLK is supplied. The second PMOS transistor 211 and the first NMOS transistor 212 constitute the CMOS inverter. In the present embodiment, a drain current of the first PMOS transistor 210, whose gate electrode is supplied with the feedback voltage $V_{FB}$ or the reference voltage $V_{REF}$, is supplied as the bias current to the second PMOS transistor 211 and the first NMOS transistor 212, and becomes an operating current of the delay cell. That is, a delay cell in which the signal propagation speed is controlled by the feedback voltage $V_{FB}$ or the reference voltage $V_{REF}$ supplied to the terminal 202 as the bias voltage of the gate electrode of the first PMOS transistor 210 is constituted. The second PMOS transistor 211 and the first NMOS transistor 212 constituting the CMOS inverter are turned on/off in response to a rise and a fall of the clock signal CLK applied to the input terminal 200, and an output signal with the clock signal CLK being inverted is output from the output terminal 201.

In the delay cell according to any embodiment, the PMOS transistor and the NMOS transistor constituting the CMOS inverter operate only in a very limited period at the time of a rise and a fall of the clock signal CLK in response to the clock signal CLK. Therefore, power consumption by the comparator 8 constituted by using the delay cell can be considerably reduced.

Fourth Embodiment

Figure 8:
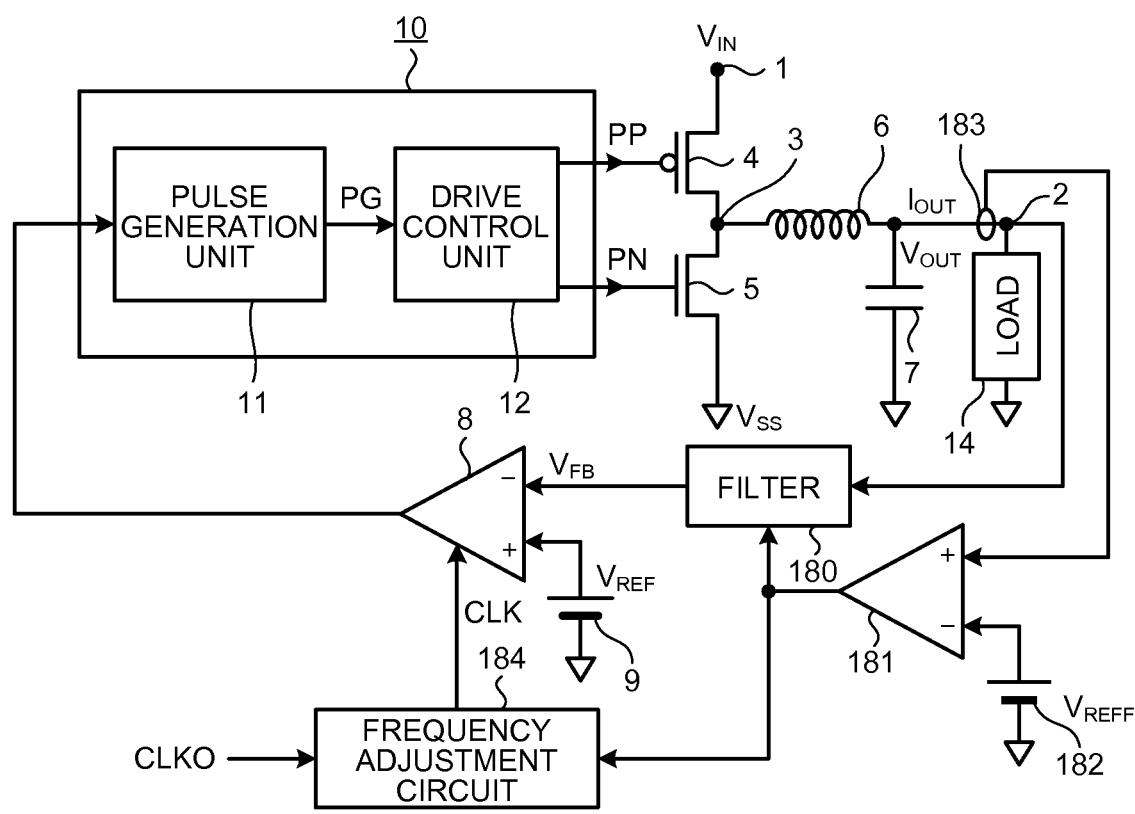
FIG. 8 illustrates a DC-DC converter according to a fourth embodiment.

FIG. 8 illustrates a DC-DC converter according to a fourth embodiment. Constituent elements corresponding to those of the embodiments described above are denoted by like reference signs and explanations thereof will be omitted. The present embodiment includes a current sensor 183 that detects the output current $I_{OUT}$ and a comparator 181 that compares an output of the current sensor 183 with a reference threshold voltage $V_{REFF}$. That is, the output of the current sensor 183 is applied to a non-inverting input terminal (+) of the comparator 181, and the reference threshold voltage $V_{REFF}$ of a reference-threshold voltage source 182 is applied to an inverting input terminal (−) thereof. When the output voltage of the current sensor 183 exceeds the reference threshold voltage $V_{REFF}$, the comparator 181 outputs a High-level signal. That is, when the output current $I_{OUT}$ increases to become a heavy load condition, a High-level signal is output from the comparator 181.

The feedback voltage $V_{FB}$ of the output voltage $V_{OUT}$ is supplied to the inverting input terminal (−) of the comparator 8 via a filter 180. The filter 180 is provided to improve responsiveness of the DC-DC converter with respect to a load variation. The output of the comparator 181 is supplied to a frequency adjustment circuit 184. The frequency adjustment circuit 184 includes, for example, a counter (not shown) and outputs the clock signal CLK when the counter value reaches a predetermined value. The clock signal CLKO from, for example, a crystal oscillator (not shown) is supplied to the frequency adjustment circuit 184. A division ratio of the frequency adjustment circuit 184 is adjusted by adjusting the count value at which the frequency adjustment circuit 184 outputs the clock signal CLK based on the output signal from the comparator 181. When a High-level signal is output from the comparator 181, that is, when the output voltage of the current sensor 183 that detects the output current $I_{OUT}$ is higher than the reference threshold voltage $V_{REFF}$, the frequency adjustment circuit 184 is adjusted so as to increase the frequency of the clock signal CLK to be supplied to the comparator 8.

The output signal of the comparator 181 is supplied to the filter 180. The frequency characteristics of the filter 180 are adjusted by the output signal from the comparator 181. When a High-level output signal is supplied from the comparator 181, that is, when the output current $I_{OUT}$ is large, the switching frequency of the DC-DC converter becomes high. By adjusting the frequency characteristics of the filter 180 according to the switching frequency of the DC-DC converter, the responsiveness of the DC-DC converter with respect to a load variation can be improved.

In the present embodiment, the output current $I_{OUT}$ is detected, and the frequency characteristics of the filter 180 are adjusted based on the detection result. Accordingly, the responsiveness of the DC-DC converter with respect to a load variation can be improved.

Figure 9A:
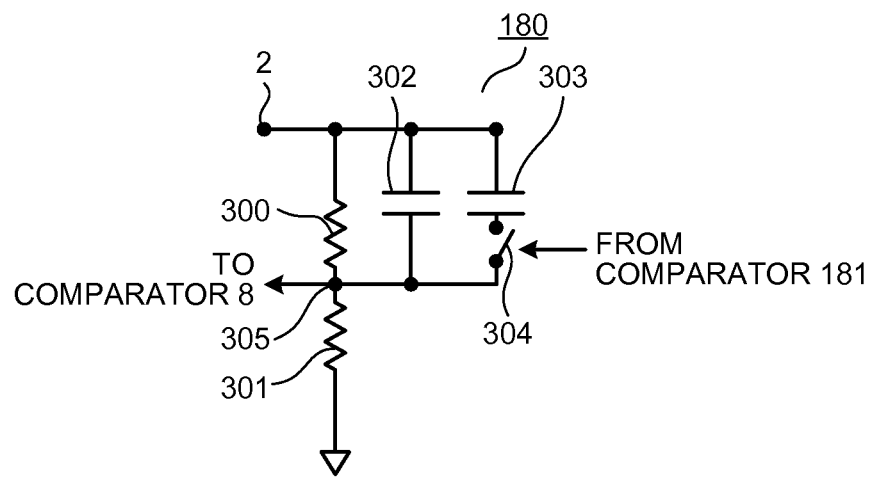
FIGS. 9A and 9B illustrate embodiments of a filter.
Figure 9B:
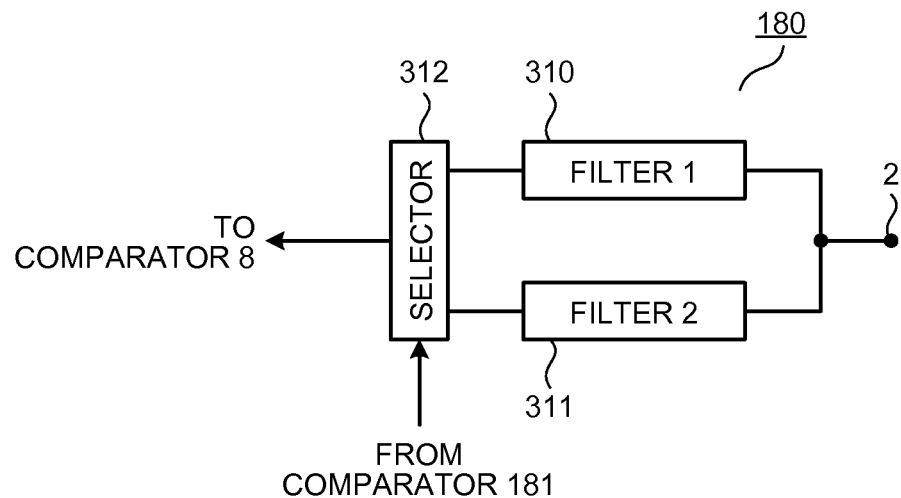

FIGS. 9A and 9B illustrate embodiments of the filter. The filter 180 according to the embodiment shown in FIG. 9A includes a first resistor 300 and a second resistor 301 serially connected between the output terminal 2 and the ground. The potential of a connection point 305 between the first resistor 300 and the second resistor 301 is supplied to the comparator 8 as the feedback voltage $V_{FB}$. A first capacitor 302 is connected in parallel to the first resistor 300. A second capacitor 303 is connected in parallel to the first resistor 300 via a switch 304. The switch 304 is turned on, for example, when the output signal from the comparator 181 is at a High level. By adjusting the capacity of the capacitor connected in parallel to the first resistor 300 based on the output signal from the comparator 181, the frequency characteristics of the filter 180 can be adjusted.

The filter 180 according to the embodiment shown in FIG. 9B includes a first filter 310 and a second filter 311 connected in parallel between the output terminal 2 and a selector 312. The selector 312 selects the first filter 310 or the second filter 311 in response to the output signal from the comparator 181 to connect the selected filter to the comparator 8. By preparing the first filter 310 and the second filter 311 having different frequency characteristics from each other and selecting a filter based on the output signal from the comparator 181, the frequency characteristics of the filter 180 can be adjusted.

Fifth Embodiment

Figure 10A:
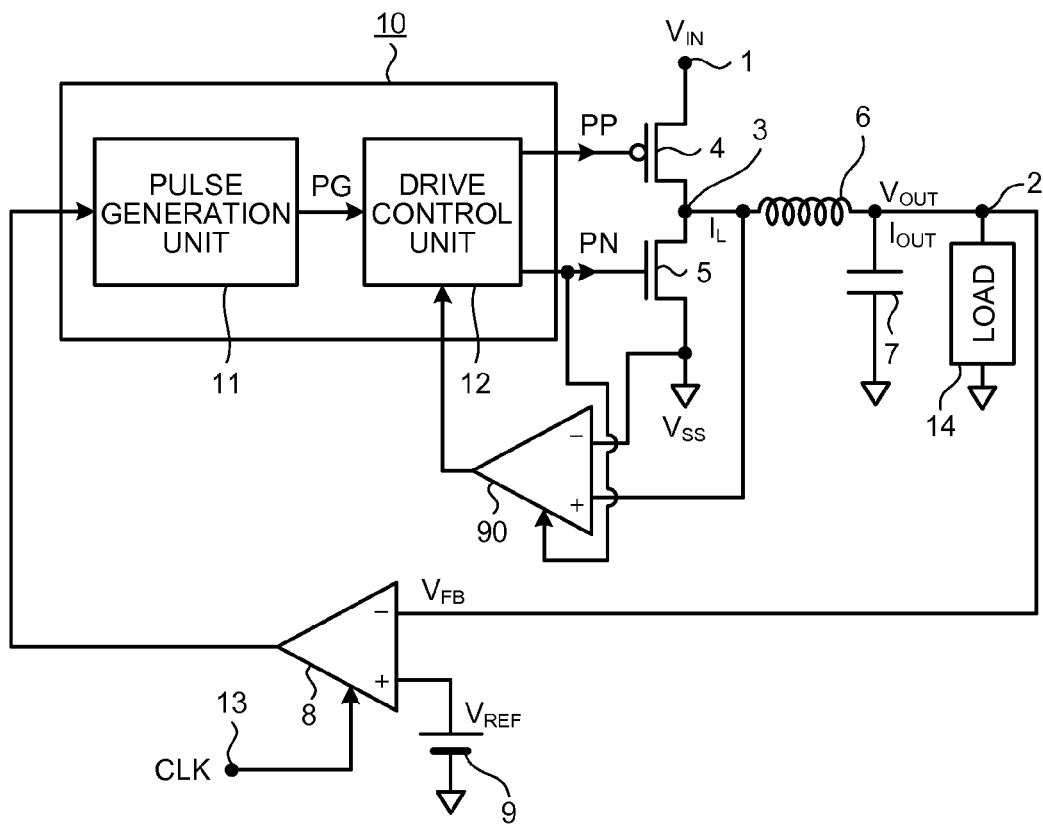
FIGS. 10A and 10B illustrate a DC-DC converter and an operation waveform thereof according to a fifth embodiment.
Figure 10B:
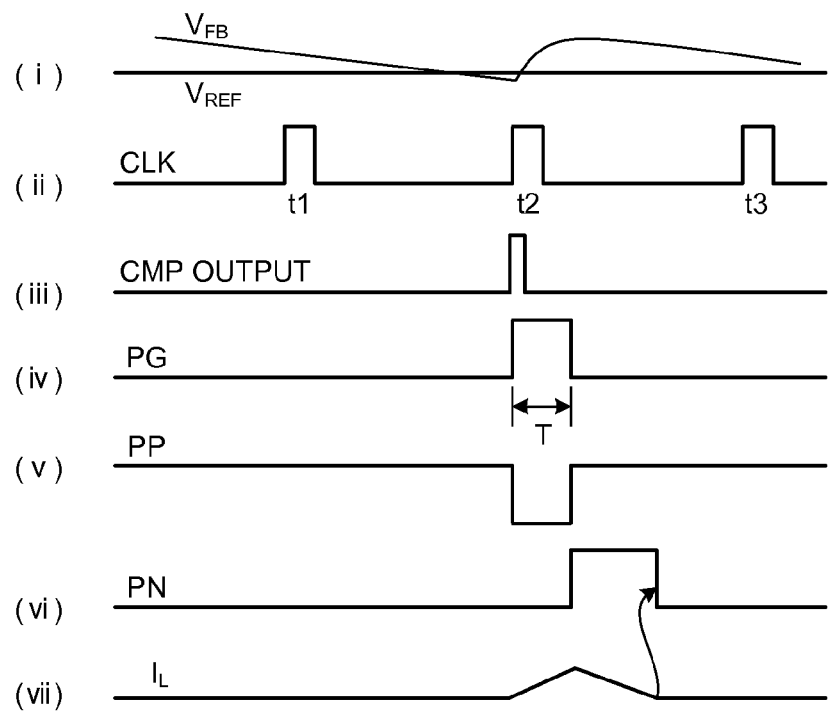

FIGS. 10A and 10B illustrate a DC-DC converter and an operation waveform thereof according to a fifth embodiment. Constituent elements corresponding to the embodiment described above are denoted by like signs and explanations thereof will be omitted. The present embodiment constitutes a DC-DC converter controlled by discontinuous conduction mode (DCM) control (hereinafter, "DCM control"). The DC-DC converter according to the present embodiment shown in FIG. 10A includes a comparator 90 with a non-inverting input terminal (+) connected to the output node 3 and an inverting input terminal (−) connected to a source electrode of the NMOS transistor 5 constituting a low-side switch. The drive signal PN of the drive control unit 12 to be supplied to the NMOS transistor 5 is supplied to the comparator 90. The drive signal PN is supplied, for example, to a gate electrode of a MOS transistor (not shown) constituting a current source of the comparator 90. Accordingly, the comparator 90 operates only while the drive signal PN of the drive control unit 12 is supplied. An output signal of the comparator 90 is supplied to the drive control unit 12.

The comparator 90 supplies a High-level signal to the drive control unit 12 when the potential of the output node 3 becomes higher than the ground potential, to forcibly stop the output of the drive signal PN. Such a phenomenon that the potential of the output node 3 becomes higher than the ground potential occurs when an inductor current $I_L$ flows from the output node 3 toward the side of the ground potential $V_{SS}$. That is, the phenomenon occurs when the inductor current $I_L$ flows backward and charges accumulated in the capacitor 7 flow toward the ground and is consumed wastefully. By turning off the NMOS transistor 5 constituting the low-side switch at a timing when the potential of the output node 3 becomes higher than the ground potential according to a comparison operation by the comparator 90, back-flow of the inductor current $I_L$ can be avoided and wasteful power consumption can be suppressed.

FIG. 10B schematically illustrates an operation waveform according to the present embodiment. (i) in FIG. 10B denotes the feedback voltage $V_{FB}$ and the reference voltage $V_{REF}$. (ii) in FIG. 10B denotes the clock signal CLK, which is supplied to the comparator 8 at the timings t1, t2, and t3. (iii) in FIG. 10B denotes an output signal of the comparator 8. Because the feedback voltage $V_{FB}$ is lower than the reference voltage $V_{REF}$ only at the time of a comparison operation at the timing t2, a High-level signal is output from the comparator 8. The pulse generation unit 11 outputs one pulse signal PG having a constant High-level period T, in response to the output signal of the comparator 8 ((iv) in FIG. 10B). The drive control unit 12 outputs the drive signal PP that turns on the PMOS transistor 4 constituting the high-side switch ((v) in FIG. 10B) and the drive signal PN that turns on the NMOS transistor 5 constituting the low-side switch ((vi) in FIG. 10B), in response to the pulse signal PG of the pulse generation unit 11. (vii) in FIG. 10B denotes the inductor current $I_L$. The comparator 90 performs the discrete-time operation in response to the drive signal PN and compares the potential of the output node 3 with the ground potential $V_{SS}$. The comparator 90 supplies a High-level output signal to the drive control unit 12 at a timing when the potential of the output node 3 becomes higher than the ground potential, that is, at a timing when the inductor current $I_L$ starts back-flow, thereby forcibly dropping the drive signal PN. Accordingly, the NMOS transistor 5 is turned off and back-flow of the inductor current $I_L$ can be avoided.

According to the present embodiment, because the DCM-controlled DC-DC converter is constituted, back-flow of the inductor current $I_L$ can be avoided and wasteful power consumption can be suppressed. Particularly, the present embodiment is effective at the time of a low load condition in which the frequency of the clock signal CLK is low and an interval between the discrete-time operations is long. This is because at the time of the low load condition, there is a high possibility of the back-flow of the inductor current $I_L$. Even when the frequency of the clock signal CLK is decreased, back-flow of the inductor current $I_L$ can be avoided and stable control can be executed. It is also possible to have such a configuration in which the length of the time when both the transistors, of the PMOS transistor 4 constituting the high-side switch and the NMOS transistor 5 constituting the low-side switch, are turned off is detected instead of detecting the output current $I_{OUT}$, and the frequency of the clock signal CLK to be supplied to the comparator 8 is adjusted according to the length of the time. When the time during which the PMOS transistor constituting the high-side switch is turned on based on one drive signal PP supplied from the drive control unit 12 is constant (a constant ON time), the charge output to the output terminal by one switching operation is substantially constant. Therefore, by detecting the switching frequency of the PMOS transistor 4 constituting the high-side switch and the NMOS transistor 5 constituting the low-side switch, detection of the output current $I_{OUT}$ can be performed equivalently. By having such a configuration, a circuit configuration for detecting the output current $I_{OUT}$ including the current sensor 183 can be omitted. Furthermore, a configuration of detecting the output current $I_{OUT}$ equivalently by counting the clock signal CLK to be supplied to the comparator 8 is also possible.

Sixth Embodiment

Figure 11:
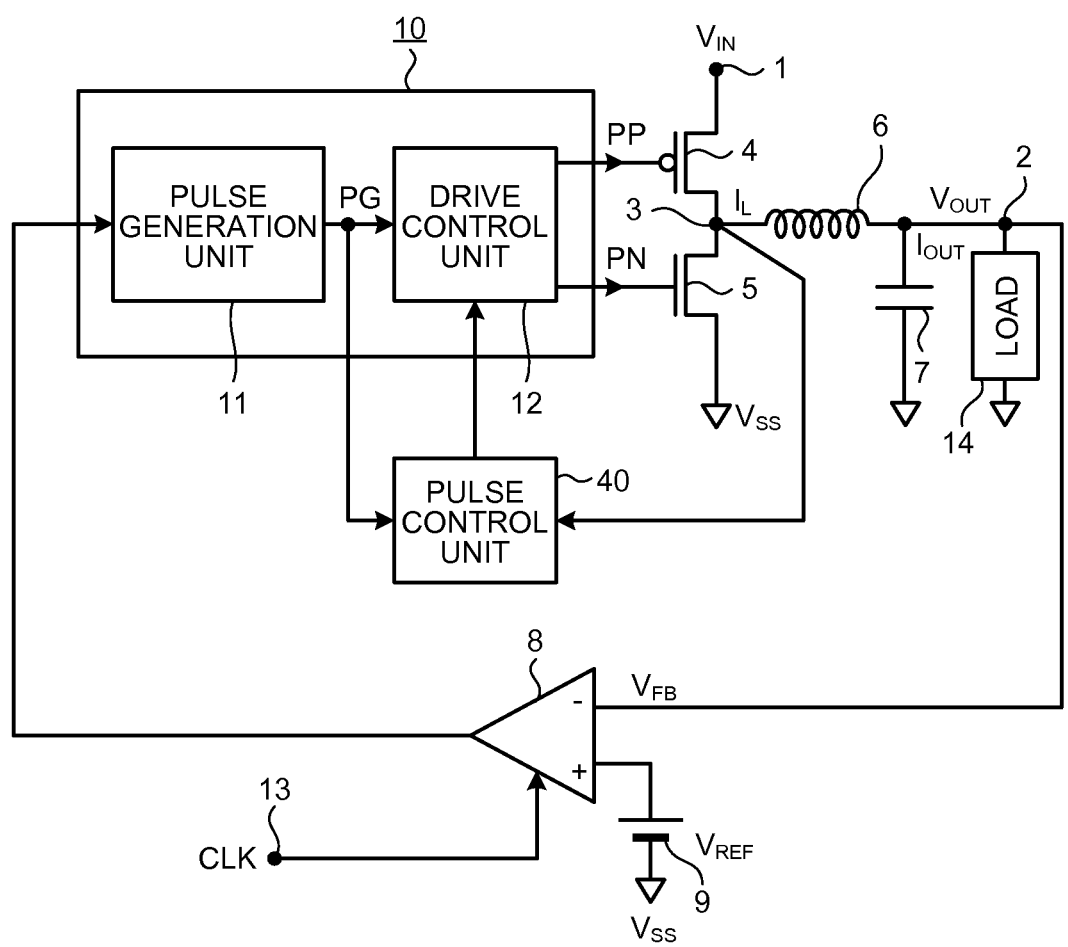
FIG. 11 illustrates a DC-DC converter according to a sixth embodiment.

FIG. 11 illustrates a DC-DC converter according to a sixth embodiment. Constituent elements corresponding to those of the embodiments described above are denoted by like reference signs and explanations thereof will be omitted. According to the present embodiment, a DCM-controlled DC-DC converter is constituted.

The present embodiment has a pulse control unit 40 to which the pulse signal PG output from the pulse generation unit 11 and the potential of the output node 3 are supplied. The pulse control unit 40 detects the potential of the output node 3 at a time when the NMOS transistor 5 is turned off and supplies a control signal for controlling a timing to turn off the NMOS transistor 5 to the drive control unit 12 according to a state of the detected potential.

When the NMOS transistor 5 is turned off in a state where the inductor current $I_L$ flows from the inductor 6 toward the side of the ground potential $V_{SS}$, the potential of the output node 3 becomes higher and, for example, becomes higher than the DC input voltage $V_{IN}$. This state corresponds to a case where the timing to turn off the NMOS transistor 5 is too late. When the timing to turn off the NMOS transistor 5 is too early, the potential of the output node 3 becomes lower than the ground potential $V_{SS}$.

Therefore, when the potential of the output node 3 at a time when the NMOS transistor 5 is turned off is detected and the timing to turn off the NMOS transistor 5 is adjusted by the pulse control unit 40 according to whether the potential of the output node 3 is, for example, higher or lower than the ground potential $V_{SS}$, control to turn off the NMOS transistor 5 at an appropriate timing can be executed. That is, with this control, the timing to turn off the NMOS transistor 5 can be adjusted and so-called "zero-cross control" can be executed. In the present embodiment, the potential of the output node 3 at a time when the NMOS transistor 5 is turned off is detected and control to adjust a timing to turn off the NMOS transistor 5 in the next switching cycle is executed.

Figure 12:
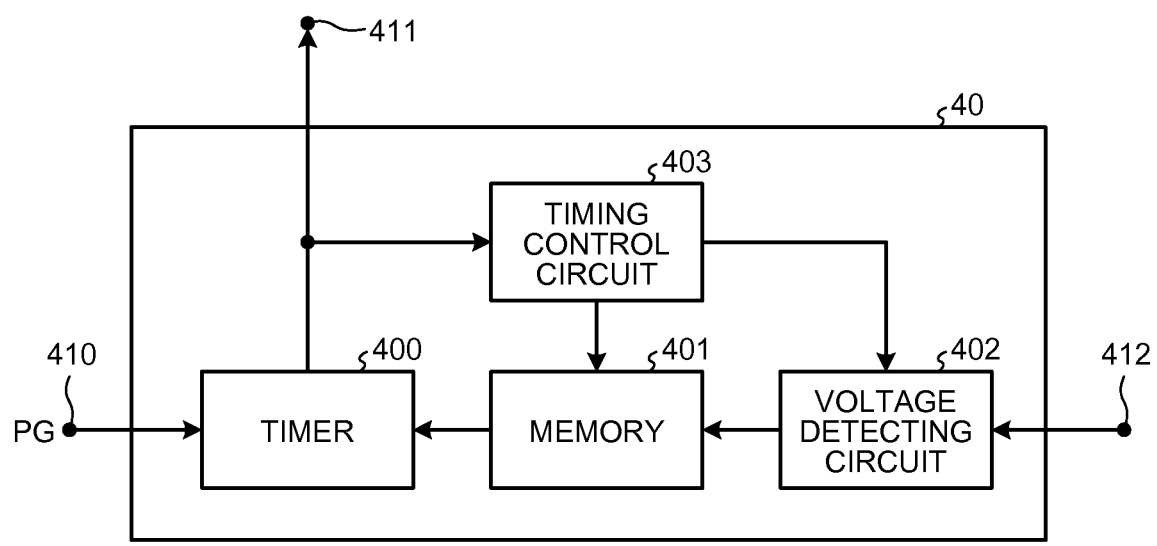
FIG. 12 illustrates an embodiment of a pulse control unit.

FIG. 12 illustrates one embodiment of the pulse control unit 40. The pulse control unit 40 according to the present embodiment has a timer 400. For example, the timer 400 outputs a control signal to a terminal 411 to stop a drive signal PN after a predetermined set time has passed from a response to the pulse signal PG supplied to a terminal 410. The terminal 411 is connected to the drive control unit 12.

A timing control circuit 403 supplies a timing signal to a voltage detecting circuit 402 and a memory 401 in response to the control signal of the timer 400. The voltage detecting circuit 402 detects the potential of the output node 3 supplied to a terminal 412 and outputs an output signal according to a detection result. For example, the voltage detecting circuit 402 can be configured with a clocked inverter that operates when the timing signal from the timing control circuit 403 is supplied thereto.

The output signal of the voltage detecting circuit 402 is supplied to the memory 401. The memory 401 holds the output signal from the voltage detecting circuit 402 for a predetermined time and then supplies the output signal to the timer 400. For example, the memory 401 can be configured with an RS latch circuit. The memory 401 can be configured to be set by the output signal from the voltage detecting circuit 402 and reset by the timing signal from the timing control circuit 403. For example, the set time of the timer 400 is adjusted according to the output of the memory 401. For example, when the timer 400 has a configuration in which a plurality of inverters connected in series are included and the set time is adjusted according to the number of stages of the inverters, the output of the memory 401 is supplied to a selection circuit that selects the number of stages of the inverters to change the number of stages of the inverters, whereby the set time of the timer 400 can be adjusted. For example, when the set time of the timer 400 is to be increased, control to increase the number of stages of the inverters connected in series is executed. When the set time is to be reduced, control to reduce the number of stages of the inverters is executed. The timing signal to reset the memory 401 is, for example, supplied to the memory 401 from the timing control circuit 403 after the set time of the timer 400 is changed according to the output of the memory 401.

When the potential of the output node 3 at a time when the NMOS transistor 5 is turned off is, for example, higher than the ground potential $V_{SS}$, that is, when the timing to turn off the NMOS transistor 5 is too late, an adjustment to reduce the set time of the timer 400 is performed. When the potential of the output node 3 at a time when the NMOS transistor 5 is turned off is lower than the ground potential $V_{SS}$, control to increase the set time of the timer 400 to delay the timing to turn off the NMOS transistor 5 is executed.

In the present embodiment, the so-called "zero-cross control" can be executed digitally. Because the NMOS transistor 5 can be turned off the predetermined time set by the timer 400 after, control to turn on/off the NMOS transistor 5 can be easily executed.

In the embodiments described above, the high-side switch is formed of the PMOS transistor 4 and the low-side switch is formed of the NMOS transistor 5. However, both the MOS transistors can be formed of NMOS transistors. In this case, the polarity of the drive signal output from the drive control unit 12 is changed according to the polarity of the MOS transistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A DC-DC converter comprising:
   a comparator circuit that compares a feedback voltage of an output voltage with a reference voltage in response to a clock signal having a certain duration period;
   a clock-signal supply unit that supplies the clock signal to the comparator circuit;
   a control circuit that controls the output voltage based on an output signal of the comparator circuit, wherein
   the comparator circuit performs a discrete-time operation during the certain duration period of the clock signal in response to the clock signal to output the output signal having a high level or a low level based on the comparison of the feedback voltage of the output voltage with the reference voltage, and
   a frequency of the clock signal is adjusted based on a mode switching signal for switching an operation mode of a load, to which the output voltage is supplied.

2. The DC-DC converter according to claim 1, wherein the comparator circuit includes
   first and second MOS transistors that constitute a differential pair, to which the feedback voltage and the reference voltage are supplied, and
   a current source circuit that supplies a bias current to the first and second MOS transistors, and the current source circuit is turned on/off in response to the clock signal, thereby performing the discrete-time operation.

3. The DC-DC converter according to claim 1, wherein the comparator circuit includes
a first delay cell column input with the clock signal and biased by the feedback voltage, a second delay cell column input with the clock signal and biased by the reference voltage, and
a logical circuit that outputs a pulse signal in response to output signals from the first delay cell column and the second delay cell column.

4. The DC-DC converter according to claim 3, wherein a delay cell in the delay cell column includes
a CMOS inverter formed of a PMOS transistor and an NMOS transistor, whose gate electrodes are commonly connected and applied with the clock signal, and
a MOS transistor that supplies a bias current to the CMOS inverter, whose gate electrode is applied with the feedback voltage or the reference voltage.

5. A DC-DC converter comprising:
a comparator circuit that compares a feedback voltage of an output voltage with a reference voltage in response to a clock signal having a certain duration period;
a clock-signal supply unit that supplies the clock signal to the comparator circuit;
a control circuit that controls the output voltage based on an output signal of the comparator circuit,
a comparison unit that compares a feedback signal according to an output current with a preset threshold, wherein
the comparator circuit performs a discrete-time operation during the certain duration period of the clock signal in response to the clock signal to output the output signal having a high level or a low level based on the comparison of the feedback voltage of the output voltage with the reference voltage, and
a frequency of the clock signal is adjusted according to an output signal of the comparison unit.

6. The DC-DC converter according to claim 5, wherein the comparator circuit includes
third and fourth MOS transistors that constitute a differential pair, to which the feedback voltage and the reference voltage are supplied, and
a current source circuit that supplies a bias current to the third and fourth MOS transistors, and the current source circuit is turned on/off in response to the clock signal, thereby performing the discrete-time operation.

7. The DC-DC converter according to claim 5, wherein the comparator circuit includes
a third delay cell column input with the clock signal and biased by the feedback voltage, a fourth delay cell column input with the clock signal and biased by the reference voltage, and
a logical circuit that outputs a pulse signal in response to output signals from the third delay cell column and the fourth delay cell column.

8. The DC-DC converter according to claim 5, comprising a filter that supplies the feedback voltage to the comparator circuit, wherein frequency characteristics of the filter are adjusted by an output signal of the comparison unit.

9. A DC-DC converter comprising:
a comparator circuit that compares a feedback voltage of an output voltage with a reference voltage in response to a clock signal having a certain duration period;
a control circuit that controls the output voltage based on an output signal of the comparator circuit;
a high-side switch connected between an input terminal applied with a DC input voltage and an output terminal applied with the output voltage;
an output node connected with one end of the high-side switch, the other end of the high-side switch being connected to the input terminal;
a low-side switch connected between the output node and a ground potential; and
a pulse control circuit that outputs a control signal for turning off the low-side switch a set time after a response to the drive signal, wherein
the control circuit generates a drive signal having a constant period during which the high-side switch is turned on, in response to the output signal of the comparator circuit,
the control circuit outputs a second drive signal that turns on/off the low-side switch and the set time of the pulse control circuit is adjusted according to a voltage of the output node at a time when the low-side switch is turned off, and
the comparator circuit performs a discrete-time operation during the certain duration period of the clock signal to output the output signal based on the comparison of the feedback voltage of the output voltage with the reference voltage.

10. The DC-DC converter according to claim 9, wherein the pulse control circuit includes a timer that outputs the control signal the set time after a response to the drive signal, and a voltage detecting circuit that detects a voltage of the output node at a time when the low-side switch is turned off and that outputs an output signal according to a detection result, and the set time of the timer is changed according to the output signal of the voltage detecting circuit.

11. A DC-DC converter comprising:
a comparator circuit that compares a feedback voltage of an output voltage with a reference voltage in response to a clock signal having a certain duration period;
a control circuit that controls the output voltage based on an output signal of the comparator circuit;
a high-side switch connected between an input terminal applied with a DC input voltage and an output terminal applied with the output voltage;
an output node connected with one end of the high-side switch, the other end of the high-side switch is connected to the input terminal;
a low-side switch connected between the output node and a ground potential; and
a second comparator circuit that compares a potential of the output node with the ground potential, wherein
when the potential of the output node becomes higher than the ground potential, the control circuit is controlled by a signal output from the second comparator circuit to turn off the low-side switch,
the comparator circuit performs a discrete-time operation during the certain duration period of the clock signal to output the output signal based on the comparison of the feedback voltage of the output voltage with the reference voltage, and
the control circuit generates a drive signal having a constant period during which the high-side switch is turned on, in response to the output signal of the comparator circuit.

12. A DC-DC converter comprising:
an input terminal to which a DC input voltage is applied;
an output terminal from which an output voltage is supplied;

a switching transistor whose source-drain path is connected between the input terminal and the output terminal;

a comparator circuit that compares a feedback voltage of the output voltage with a reference voltage;

a clock-signal supply unit that supplies a clock signal that causes the comparator circuit to perform a discrete-time operation; and a control circuit that outputs a drive signal for turning on/off the switching transistor based on an output signal of the comparator circuit, wherein a maximum value of a switching frequency of the switching transistor is controlled to be equal to or lower than a frequency of the clock signal.

13. The DC-DC converter according to claim 12, wherein the control circuit generates a drive signal that turns on the switching transistor for a certain time in response to the output signal of the comparator circuit.

14. The DC-DC converter according to claim 13, further comprising:

a second switching transistor connected between the switching transistor and a ground potential and turned on/off by the drive signal from the control circuit;

an output node to which the switching transistor and the second switching transistor are connected; and a second comparator circuit that compares a potential of the output node with the ground potential, wherein when the potential of the output node becomes higher than the ground potential, the control circuit is controlled by a signal output from the second comparator circuit to turn off the second switching transistor.

15. The DC-DC converter according to claim 12, wherein a frequency of the clock signal is adjusted based on a mode switching signal for switching an operation mode of a load, to which the output voltage is supplied.

* * * * *